United States Patent [19]

Zacharias et al.

[11] Patent Number: 4,480,515
[45] Date of Patent: Nov. 6, 1984

[54] ARTICLE EJECTION APPARATUS

[75] Inventors: Theodor Zacharias, Meerbusch; Hans D. Gerhards, Solingen-Gräfrath; Karlhans Staat, Homberg, all of Fed. Rep. of Germany

[73] Assignee: Kocks Technik GmbH & Co., Hilden, Fed. Rep. of Germany

[21] Appl. No.: 496,388

[22] Filed: May 20, 1983

Related U.S. Application Data

[63] Continuation of Ser. No. 190,227, Sep. 24, 1980, abandoned.

[30] Foreign Application Priority Data

Oct. 8, 1979 [DE] Fed. Rep. of Germany ....... 2940761

[51] Int. Cl.³ .............................................. B26D 7/18
[52] U.S. Cl. .......................................... 83/81; 83/82
[58] Field of Search ...................................... 83/81, 82

[56] References Cited

U.S. PATENT DOCUMENTS 1,830,760 11/1931 Johnsen ................................. 83/81
3,522,750 8/1970 Shallenberg .......................... 83/82

Primary Examiner—Donald R. Schran
Attorney, Agent, or Firm—Buell, Blenko, Ziesenheim & Beck

[57] ABSTRACT

Apparatus for laterally ejecting elongate articles, such as tube lengths, from a channel defined by a roller bed, the channel extending beyond a flying saw for severing continuous lengths into said elongate articles, said apparatus being operated by a signal generator fitted to the flying saw so that an ejection operation is initiated by an optional delay after completion of a severing operation. Operation is not impaired in the event of the tube being fractured during the rolling operation, since the ejection operation takes place in timed relation to the severing operation and does not depend on detection of the presence or absence of tube ends.

9 Claims, 2 Drawing Figures

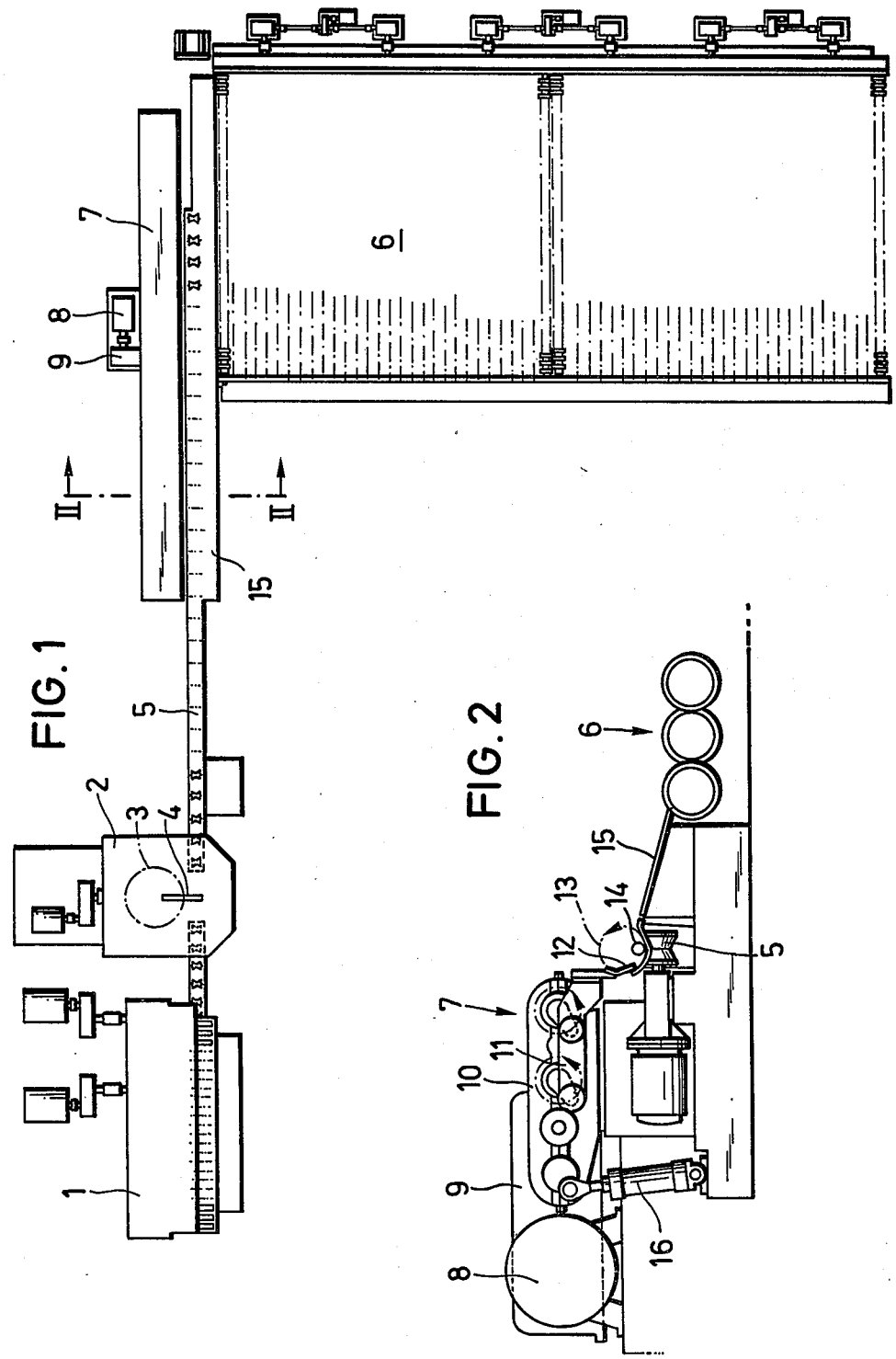

ARTICLE EJECTION APPARATUS

This is a continuation of application Ser. No. 190,227, filed Sept. 24, 1980, now abandoned.

This invention relates to article ejection apparatus and particularly to an apparatus for the lateral ejection of an elongate article out of a channel from a roller bed or the like beyond a severing device.

Apparatus of this kind is required beyond, for example, a stretch-reducing rolling mill for tubes beyond which is usually disposed a flying saw which subdivides the tube into portions of desired length while the tube is running through. The lengths of tube, thus, produced are fed to a cooling bed by way of a delivery roller bed beyond the saw, the lengths of tube being ejected onto the cooling bed transversely of the original direction of movement by means of the aforesaid ejection apparatus.

In a known ejection apparatus of this kind, the ejection movement is triggered by pulse generators which detect either the leading end or the trailing end of each length of tube. The pulse generators are disposed in the region of the ejection apparatus, particularly in the vicinity of the delivery roller bed. The chief disadvantage of this known type of construction is that it does not operate in a reliable manner. Faulty control frequently occurs, particularly when the article is subdivided in an undesirable and unforeseeable manner. The latter occurs particularly when the tube has been broken in the stretch-reducing rolling mill. When this occurs, the leading and trailing pieces of tube are spaced apart to a greater or lesser extent and the two pieces of tube arrive with this spacing in the region of the ejection apparatus. When the ejection apparatus is triggered by a pulse generator which responds to the leading end of the tube, the latter initiates the ejection operation as soon as the leading piece of tube has reached this pulse generator. At this instant, however, the trailing end of the trailing piece of tube has not yet advanced into the region of the cooling bed owing to the aforementioned distance between the two pieces of tube. Nevertheless, these pieces of tube are then ejected, so that the trailing piece of tube either projects beyond the cooling bed or it drops adjacent the cooling bed. Both these operating faults constitute a breakdown which has to be rectified. This can result in serious accidents and parts of the plant may be damaged.

Faulty control by broken-off pieces of tube can also occur if the pulse generator is arranged such that it reacts to the tracking end of the tube, since the trailing end of the leading piece of broken tube initiates the ejection operation while the trailing piece of broken tube is entering the region of the ejection apparatus. The trailing piece of tube can then seriously impair the ejection operation or can remain in the region of the ejection apparatus, so that the following tube length would run onto it if the piece of broken tube remaining in the region of the ejection apparatus were not separately removed by the operation personnel.

Thus, in prior art practice, in order to avoid these faults and similar faults, several of these ejection apparata have been disposed in tandem and special circuits and arrangements for the pulse generators have been provided in the region of the delivery roller bed, or the faults have been rectified by repeated manual intervention. In a plant of this kind, these measures led to very great lengths and thus to considerable spatial requirements. Furthermore, a particularly rapid succession of tube lengths could not be obtained, thus impairing the efficiency and thus the economy of a plant of this kind.

An object of the present invention is to provide an apparatus for the lateral ejection of elongate articles, an apparatus which does not have the above-mentioned disadvantages and which renders it possible to obtain a rapid succession of closely spaced tubes with high operational reliability.

The present invention consists in apparatus for the lateral ejection of elongate article out of a channel defined by a roller bed or the like, the channel extending beyond a severing device adapted to sever material into said lengths, the apparatus being provided with means responsive to operation of said severing device for initiating operation of the ejection apparatus after the termination of each operation. Thus, the ejection operation is no longer initiated by the leading ends or the trailing ends of the tube lengths, but by the operation of the severing device. The severing device and the ejection apparatus operate largely in timed relation, even though they operate out of phase. Since severing devices of this kind are so-called "flying" devices which move synchronously with the tube during the severing operation, the actual speed of the tube lengths is accuratley measured in such devices. Such "flying" severing devices have been known and used for more than 50 years. Their operation is described at page 979 of "THe Making, Shaping and Treating of Steel", 9th Ed., 1970, U.S. Steel Corp. and in U.S. Pat. No. 1,830,760. Furthermore, the position of the point of severance can be accurately determined on the severing device, particularly by the position of the jointly running severing device itself. If the exact position of the point of severance and the actual run-through speed of the tubes are known, it is also possible accurately to determine the time required for the point of severance to enter the region of the cooling bed. It is also then known when the ejection apparatus has to be actuated. Thus, the pulse for the ejection apparatus always occurs at the correct instant when the pulse comes from a pulse generator fitted to the severing device, which also renders it possible to obtain a rapid succession of closely spaced tubes.

The time delay which is provided should be adjustable, since, in general, the run-through speeds of the tubes vary. The time delay is always necessary when there is a great distance between the severing device and the cooling bed or the ejection apparatus. The point of severance has to cover this distance before the ejection operation can be initiated.

Thus, the apparatus in accordance with the invention operates irrespective of broken tubes and does not react to the unforeseeable distances occuring between a leading and a trailing end portion of two pieces of broken tube, but only to the actual points of severance, occasioned by the severing device. The two pieces of the broken tube are simultaneously ejected. The distance between the pieces of tube imparted thereto in the stretch-reducing rolling mill is immaterial, since they are always located between two points of severance by the severing device whose distances apart are accurately maintained.

Consequently, the pulses for initiating the ejection operation always occur at the correct instant, so that the faults mentioned initially do not occur. Furthermore, the distance between two successive tubes can be very short, so that only one apparatus in accordance with the invention is required and, consequently, the plant need have only a short overall length.

Moreover, a further feature of the invention is that the speed at which the ejector of the ejection apparatus is driven while it is engaging the article is preferably different from the speed at which it is driven during its idle movement. It is thereby also possible to minimize the duration of the ejection operation in order to obtain a rapid succession of tubes. According to the construction of the ejection apparatus, it can be advantageous for the ejector, even when it is gripping the article, to move more rapidly or, alternatively, more slowly than it moves along the path of movement which it covers after ejecting the article until it reaches its starting position again.

The invention is further described, by way of example, with reference to the drawings, in which:

FIG. 1 is a plan view of a rolling mill having an ejection apparatus in accordance with the invention, and FIG. 2 is a section taken on the line II—II of FIG. 1.

Referring to FIG. 1, tubes from a furnace (not illustrated) are fed to a stretch-reducing mill 1. The diameter and wall thickness of these tubes are reduced in the rolling mill, the length then imparted to the tubes being substantially greater than the described commercial length. A severing device 2 in the form of a so-called "flying saw" is disposed at a short distance beyond the stretch-reducing rolling mill 1. THe dash-dot circle 3 constitutes the orbit along which a rotary saw blade 4 is traversed to cut the tubes to the desired length. A delivery roller bed 5 conveys the lengths of tube to a cooling bed 6. The roller bed 5 defines a channel in which the tube lengths are received. The lengths of tube are transferred from the delivery roller bed 5 to the cooling bed 6 by means of an ejection apparatus 7.

The ejection apparatus 7 is clearly shown in FIG. 2. The drive 10 of the ejection apparatus 7 is driven by a motor 8 by way of a transmission unit 9. An ejector 12 can be moved along a circular path 13 by a crank drive 11 such that a tube 14 is lifted from the channel defined by V-shaped rollers of the roller bed 5 and is fed to a sloping runway or ramp 15 and to the cooling bed 6. The speed of movement of the ejector 12 along the circular path 13 can vary. In particular, the speed at which the ejector 12 is driven while it is engaged with a tube being ejected can be different from its speed during its idling stroke. A pneumatic cylinder 16 serves only to compensate for weight. The ejection apparatus 7 operates in a stop/start mode and is illustrated in its rest position in FIG. 2. The ejection apparatus receives its pulse for starting from a pulse generator of conventional type (not illustrated) of the severing device 2 after the termination of each severing operation. Such a conventional impulse sender is shown as part 148 in U.S. Pat. No. 1,830,760. The pulse is delayed between the pulse generator and the starter switch for the ejection apparatus 7 by any of various well-known time delay devices so that the ejection operation is not performed until the cut length has reached the region of the cooling bed 6. Such well known time delay devices are described in many publications including, for example, "Timing Controls", 1966 Ed., Industrial Timer Corp., a division of Amercon. No mis-termed operation of the ejection apparatus 7 is caused by broken pieces of tube since the correct time delay is allowed for both pieces to reach the region of the cooling bed 6.

In the foregoing specification we have set out certain preferred practices and embodiments of our invention, however, it will be understood that this invention may be otherwise embodied within the scope of the following claims.

We claim:

1. Apparatus for the lateral ejection of elongate lengths of articles such as pipe out of a channel defined by a roller bed or the like, the channel extending beyond a severing device adapted to sever material into said lengths while moving in the lengthwise direction, the apparatus comprising means engaging said elongate lengths to move them transverse to their length out of said channel, drive means driving said engaging means and actuating means responsive to operation of said severing device for initiating operation of the drive means after the termination of each severing operation, said actuating means including a pulse generator fitted to the severing device and delivering a start signal to the drive means at the end of each severing apparatus and a delay device between the pulse generator and drive means for delaying operation of the drive means by an optional amount.

2. Apparatus as claimed in claim 1, in which the severing device is a flying severing device.

3. Apparatus as claimed in claim 1, in which the speed at which an ejector of the ejection apparatus is driven whicle it is engaging an article is different from the speed at which it is driven during its idle movement.

4. Apparatus as claimed in claim 2 in which the speed at which an ejector of the ejection apparatus is driven while it is engaging an article is different from the speed at which it is driven during its idle movement.

5. Apparatus for the ejection of articles from a channel having an ejector adapted to engage an article and to dislodge it from the channel and means adapted to drive the ejector so that its speed while it is in engagement with the article is different from that during its idle stroke.

6. an apparatus as claimed in claim 1 in which the said actuating means includes a signal generator fitted to said severing device.

7. An apparatus as claimed in claim 1 wherein the severing device is a flying saw.

8. An apparatus as claimed in claim 7 wherein the actuating means includes a signal generator fitted to said flying saw.

9. An apparatus as claimed in claim 8 wherein the actutuating means includes a time delay switch receiving a signal from the signal generator for activating the ejection apparatus.

UNITED STATES PATENT AND TRADEMARK OFFICE
CERTIFICATE OF CORRECTION

PATENT NO. : 4,480,515

DATED : November 6, 1984

INVENTOR(S) : THEODOR ZACHARIAS; HANS D. GERHARDS; KARLHANS STAAT

It is certified that error appears in the above-identified patent and that said Letters Patent is hereby corrected as shown below:

Column 2, line 17, after each, insert --severing--.

Colume 2, line 28, change "THe" to --The--.

Column 3, line 25, change "described" to --desired--.

Column 3, line 28, change "THe" to --The"--.

Column 4, line 4, change "mis-termed" to --mis-timed--.

In claim 3, line 35, change "whicle" to --while--.

Signed and Sealed this

Twenty-third Day of April 1985

[SEAL]

Attest:

DONALD J. QUIGG

Attesting Officer    Acting Commissioner of Patents and Trademarks